March 17, 1953     C. GROB     2,632,025
METHOD FOR PREPARING 5, 8 DIALKOXY TETRALONE-2
Filed Sept. 23, 1949
I
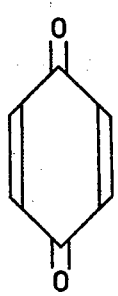
II
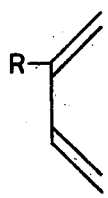
III
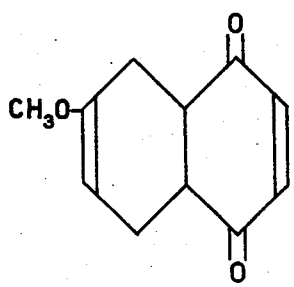
IV
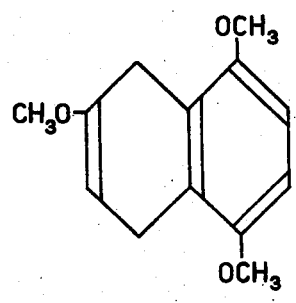
V
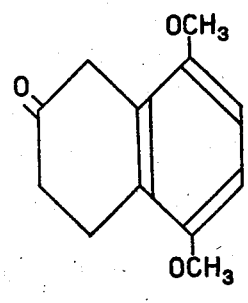
Inventor
Cyril Grob
By  Atty.

Patented Mar. 17, 1953

2,632,025

UNITED STATES PATENT OFFICE 2,632,025

METHOD FOR PREPARING 5,8 DIALKOXY TETRALONE-2

Cyril Grob, Basel, Switzerland, assignor to Organon Inc., Orange, N. J., a corporation of New Jersey Application September 23, 1949, Serial No. 117,487
In the Netherlands October 2, 1948

5 Claims. (Cl. 260—590)

The invention relates to a process for the manufacture of substituted compounds derived from naphthalene.

The Roman figures mentioned below refer to the formulae in the annexed drawing.

I have found that naphthoquinones-1.4 substituted in the 6 position and the free or substituted hydroxyl compounds derived herefrom can be prepared by diene synthesis from benzoquinones (I) and 2-substituted-buta-1.3-diene (II). The preparation of II can take place in analogous manner as described by H. B. Dijkstra (J. A. C. S. 57, 2255, (1935)) or by R. O. Norris, J. J. Verbanc, C. F. Hennion (J. A. C. S. 60, 1159 (1938)). I have further found how the reaction product of this diene synthesis must be worked up.

In the following only the introduction of a methoxy group into the 6 position and the decomposition thereof is spoken of, but within the scope of the invention all kinds of other substituents can be introduced and decomposed in the 6 position.

When benzoquinone is condensated e. g. in petrol ether with 2-methoxy-butadiene the desired 1-4-diketo-6-methoxy-1.4.5.8.9.10-hexahydronaphthalene is obtained in good yield (III). This compound is very sensitive to acids and alkalies so that the medium has to be kept neutral. To prepare β-tetralones (V) herefrom one thinks of alkaline conversion of III. Then, however, only undefined insoluble products are obtained. Surprisingly I have found, however, that when one operates in an alkaline medium and alkylates simultaneously, e. g. with dimethylsulfate, without trouble exclusively e. g. 1.4.6-trimethoxy-5.8-dihydro-naphthalene (IV) is obtained in good yield. This compound can be practically quantitatively saponified with diluted hydrochloric acid to e. g. 5.8-dimethoxy-2-tetralone (V). It is possible to simultaneously obtain compounds IV and V by temporarily acidifying the alkaline methylation mixture during the course of the methylation reaction. An advantage of this latter modification of the process can be seen herein that in this manner in one operation three reaction stages have been taken up, namely the conversion, the alkylation and the dehydrogenation. From a preparative standpoint it is better, however, to keep the medium continuously alkaline and to convert this only to V after IV has been isolated.

EXAMPLE

A. Formation of III from I and II 51 g. of freshly distilled 2-methoxy-butadiene and 44 g. of benzoquinone purified by sublimation are refluxed for three days with 400 cm.$^3$ of petroleum ether (B. P. 50–65° C.), the benzoquinone slowly dissolving. On cooling the reaction product crystallizes out. It is sucked off and a small quantity of unchanged benzoquinone is sublimated away at 30° C. After recrystallization from petroleum ether and sublimation at 0.01 mm. and 70° C. a pure final product with a melting point of 88–89° C. is obtained in a yield of 58%. When benzene is chosen as a solvent the yield is about 30%.

B. Alkaline alkylation from III to IV 10 g. of III are dissolved in 30 cm.$^3$ of absolute alcohol. In a nitrogen flow (purified with alkaline pyrogallol and sulfuric acid) a solution of 5.4 g. of sodium in 150 cm.$^3$ of absolute alcohol is added dropwise and after 10 minutes 20 cm.$^3$ of dimethylsulfate. After 20 min. one evaporates in vacuo. The residue is taken up in weak lye and thereupon extracted by shaking out with ether; the ether solutions are washed with water till neutral and dried on anhydrous sodium sulfate. The ether is evaporated and the obtained oil is distilled in vacuo (at 127–130° C. and 0.05 mm.). The pale yellow oil crystallizes; the crystals are recrystallized from ether-petroleum ether. Melting point 80–82; yield 65%.

C. Saponification from IV to V 2.5 g. of IV are dissolved in 23 cm.$^3$ of alcohol and 15 cm.$^3$ of 2 N hydrochloric acid are added. At approximately 30° C. the alcohol is removed in vacuo. From the aqueous residue 2.3 g. of V are obtained after recrystallization from ether-petroleum ether, the M. P. is 99° C.

Compounds of this type are important links in the complete synthesis of steroids.

Having now particularly described and ascertained the nature of my said invention and what manner same is to be performed, what I claim is:

1. In the method of producing 5,8-dialkoxy tetralone-2 compounds, the steps comprising reacting benzoquinone in a neutral medium with a 2-alkoxy butadiene-1,3, subjecting the resulting 1,4-diketo-6-alkoxy-1,4,5,8,9,10-hexahydronaphthalene in an alkaline medium to the action of an alkylating agent, and hydrolyzing the 1,4,6-trialkoxy-5,8-dihydronaphthalene obtained thereby, by means of a mineral acid.

2. In the method according to claim 1, the steps comprising using 2-methoxy butadiene-1,3 as the one starting material and carrying out the alkylation by means of a methylating agent.

3. In the method of producing 5,8-dimethoxy tetralone-2 compounds, the steps comprising reacting p-benzoquinone in petrol ether while boiling under reflux, with a 2-alkoxy butadiene-1,3, isolating the resulting 1,4-diketo-6-alkoxy-1,4,5,8,9,10-hexahydronaphthalene from the reaction mixture, subjecting the isolated diketo compound in a nitrogen atmosphere in alcoholic solution in the presence of an alkali metal alcoholate to the action of dimethylsulfate, evaporating the solvent and the excess of the alkylating agent in a vacuum, extracting the residue with ether, isolating the resulting 1,4,6-trialkoxy-5,8-dihydronaphthalene from the ethereal solution, hydrolyzing said trialkoxy compound in alcoholic solution with dilute hydrochloric acid, and isolating from the hydrolysation mixture the 5,8-dimethoxy-2-tetralone formed thereby.

4. In the method of producing 5,8-dialkoxy tetralone-2 compounds, the steps comprising reacting benzoquinone in a neutral medium with a 2-alkoxy butadiene-1,3, subjecting the resulting 1,4-diketo-6-alkoxy-1,4,5,8,9,10-hexahydronaphthalene in an alkaline medium to the action of a dialkyl sulfate, and hydrolyzing the 1,4,6-trialkoxy-5,8-dihydronaphthalene obtained thereby, by means of a mineral acid.

5. In the method according to claim 4, wherein 2-methoxy butadiene-1,3 is the 2-alkoxy butadiene-1,3 and dimethyl sulfate is the dialkyl sulfate.

CYRIL GROB.

REFERENCES CITED

The following references are of record in the file of this patent:

Diels et al., Berichte, vol. 62, pages 2337–72 (1929).

Dykstra, J. Am. Chem. Soc., vol. 57, pages 2255–2259 (1935).

Cornforth et al., J. Am. Chem. Soc., 1946 volume, pages 676–679.

Cornforth et al., J. Am. Chem. Soc., 1942 volume, pages 689–691.

Grob and Wicki, Helv. Chim. Acta, vol. 31, pages 1706–1713, Oct. 15, 1948.